United States Patent [19]

Okano et al.

[11] Patent Number: 4,865,882

[45] Date of Patent: Sep. 12, 1989

[54] METHOD FOR POWDER COATING OF METALLIC ARTICLES

[75] Inventors: Tatsuro Okano, Narashino; Akira Hasegawa, Yachiyo, both of Japan

[73] Assignee: Seitetsu Kagaku Co., Ltd., Hyogo, Japan

[21] Appl. No.: 224,310

[22] Filed: Jul. 26, 1988

[30] Foreign Application Priority Data

May 26, 1988 [JP] Japan ................... 63-129694

[51] Int. Cl.$^4$ .................... B05D 7/14; B05D 7/22; B05D 1/24; B05D 3/02
[52] U.S. Cl. ............................ 427/195; 427/183; 427/185; 427/202
[58] Field of Search ............... 427/27, 29, 185, 183, 427/195, 202

[56] References Cited

U.S. PATENT DOCUMENTS

| | | | |
|---|---|---|---|
| 4,268,579 | 5/1981 | Suzuki et al. | 427/195 X |
| 4,307,133 | 12/1981 | Haselien | 427/195 |
| 4,430,135 | 2/1984 | Schmukler et al. | 427/195 X |
| 4,675,210 | 6/1987 | Clayton et al. | 427/195 X |

*Primary Examiner*—Evan Lawrence
*Attorney, Agent, or Firm*—Jones, Tullar & Cooper

[57] ABSTRACT

A method for powder coating of a metallic article which comprises subjecting the metallic article to powder coating with a resin composition comprising 80 to 97% by weight of a modified polypropylene and 20 to 3% by weight of very low density polyethylene to form a resin coating film having excellent heat resistance and elongation on the article.

8 Claims, No Drawings

METHOD FOR POWDER COATING OF METALLIC ARTICLES

FIELD OF THE INVENTION

The present invention relates to a method for powder coating of metallic articles. More particularly, it relates to a method for forming a coating film of a resin having high adhesive strength to a metal as well as excellent heat resistance, hot water resistance and elongation on a surface of a metal.

BACKGROUND OF THE INVENTION

Hitherto, a powdered paint of an olefin polymer base, particularly, that of a polyethylene or its copolymer has been widely used for providing corrosion resistance, chemical resistance and stain resistance to metallic articles. For example, it is used for various articles such as draining boards, vegetable baskets, baskets for bicycles, shelves of refrigerators and the like, which can be often seen in our everyday life.

In the field of daily necessaries as described above wherein heat resistance is not particularly required, coating with a polyethylene or its copolymer is sufficient for attaining the above purpose. However, in the case that coated metallic articles are those to be used under high temperature conditions such as hot water pipes, peripheral parts of automobile engines and the like, sufficient resistance can hardly be obtained by coating with a polyethylene or its copolymer.

On the other hand, polypropylene has been widely used as a material for producing various molded articles because of its excellent heat resistance and dimensional stability as well as its small coefficient of thermal expansion. However, there are few cases that polypropylene is used in powder coating because, when a metal is subjected to powder coating with polypropylene, there are problems such as low adhesiveness between polypropylene and a metal and inferior elongation of a coating film obtained after coating.

Japanese Patent Kokai No. 59-30841 discloses a composition for fluidized bed dip coating to improve adhesion to a metal. In Example 6 thereof, there is disclosed that polypropylene is dryblended with polypropylene modified by treatment with maleic anhydride to obtain a composition, and a metal is subjected to fluidized bed dip coating by using this composition. The resulting coated material shows improved adhesiveness. However, adhesiveness is still insufficient, and low elongation of the coating film is scarcely improved.

Further, Japanese Patent Kokai Nos. 62-190265 and 62-190266 disclose improvement of adhesiveness in the case that a metallic article to be subjected to powder coating is used in a hot atmosphere as well as improvement of inferior elongation of a coating film of a polypropylene. The former application discloses a resin composition for powder coating which comprises a modified polypropylene obtained by graft copolymerization of a part or all of a crystalline random copolymer composed of propylene and $\alpha$-olefin with an unsaturated carboxylic acid or its anhydride, a polyethylene, a metal oxide or hydroxide and a nucleating agent. From the viewpoint of the resin ingredients, the composition disclosed in the latter application is the same as that of the former application except that a vinylcycloalkane polymer having 6 or more carbon atoms is further added thereto. When a metal is coated with the compositions disclosed in both applications, adhesion and elongation of the resulting coating film are improved. However, adhesiveness and elongation in a hot atmosphere or in hot water dipping should be further improved.

In the case of a metal subjected to powder coating, good elongation of a coating film is one of the important requisites. For example, if elongation of a coating film is inferior, bared metal surface is exposed at an edge of a corner of a metallic article. Further, when the shape of a metallic article is complicated, the coating film is broken even by a small amount of stress or impact, which spoils the original purpose of the article. Still another problem is that cracking is liable to form by thermal stress.

OBJECTS OF THE INVENTION

Under these circumstances, the present inventors have intensively studied adhesion between a metal and a polypropylene and a powder coating method which can provide good elongation of a coating film after coating in a hot atmosphere and in hot water dipping. As the result, it has been found that, when polypropylene modified by treatment with an unsaturated carboxylic acid or its anhydride is blended with polyethylene having very low density which is almost the same density as that of the modified polypropylene, they can be thoroughly mixed with each other upon blending due to, perhaps, their similar densities, and that, when they are used in powder coating, no phase separation at melting on a metallic article is observed and a smooth, glossy and rigid but flexible coating film can be obtained.

Further, it has been found that a powdered paint obtained by mechanically pulverizing a composition composed of the modified polypropylene which is blended with a prescribed amount of the above polyethylene having very low density has excellent adhesiveness to a metal and the resulting coating film shows remarkably improved elongation in comparison with a coating film formed with the conventional modified polypropylene compositions as disclosed in Japanese Patent Kokai Nos. 62-190265 and 62-190266.

Further, when the above powdered paint is applied on a surface of a metal which has been treated with a primer composed of a diene polymer and magnesium oxide such as that disclosed in Japanese Patent Kokoku No. 53-5045, the resulting coating film shows good elongation and keeps strong adhesive strength for a long period of time even under conditions of hot water dipping.

That is, the main object of the present invention is to provide an improved method for powder coating of metallic articles which can form a resin coating film having good adhesiveness to a metal as well as excellent heat resistance, hot water resistance and good elongation.

This object as well as other objects and advantages of the present invention will become apparent to those skilled in the art from the following description.

SUMMARY OF THE INVENTION

According to the present invention, there is provided a method for powder coating which comprises subjecting a metallic article to powder coating with a resin composition comprising 80 to 97% by weight of polypropylene modified by treatment with an unsaturated carboxylic acid or its anhydride which has a density of 0.885 to 0.920, preferably 0.890 to 0.915, and 20 to 3% by weight of very low density polyethylene having a density of 0.880 to 0.920, preferably 0.890 to 0.910, to form a resin coating film having heat resistance and good elongation on the article.

Further, the present invention provides a method for powder coating which comprises treating a surface of a metallic article with a primer comprising a diene polymer and magnesium oxide and subjecting the article to powder coating with the above resin composition to form a resin coating film having heat resistance as well as hot water resistance and good elongation on the article.

DETAILED EXPLANATION OF THE INVENTION

The modified polypropylene used in the present invention can be produced according to the same manner as described in Example 1 of Japanese Patent Kokai No. 62-190266. That is, a crystalline random copolymer composed of 90 to 99% by weight of propylene and 10 to 1% by weight, preferably 8 to 2% by weight of α-olefin other than propylene having 2 to 10 of carbon atoms is preferably employed as the raw material resin. As the α-olefin, ethylene can be preferably used. When the ratio of α-olefin to be copolymerized is lower than 1% by weight, a smooth coating film can hardly be obtained at a temperature lower than 250° C. which is the decomposition temperature of polypropylene because the melting point of the resulting copolymer is too high and viscosity at melting is too high. On the other hand, when the ratio of α-olefin to be copolymerized exceeds 10% by weight, heat resistance and surface hardness of the coating film is lowered because the melting point of the resulting copolymer becomes too low.

As the unsaturated carboxylic acid or its anhydride to be used for modification of polypropylene, there can be used, for example, acrylic acid, methacrylic acid, maleic acid, maleic anhydride, fumaric acid, itaconic acid, itaconic anhydride and the like. Among them, maleic anhydride is preferred.

It is preferred that the amount of the unsaturated carboxylic acid or its anhydride which is incorporated into the acid modified polymer is 0.01 to 5% by weight based on the modified polypropylene. When the amount is lower than 0.01% by weight, improvement of physical properties is hardly expected. On the other hand, when the amount exceeds 5% by weight, the effect of modification is decreased. Any conventional method can be used in the acid modification of polypropylene. For example, the modified polypropylene can be produced by heating a mixture of polypropylene, an unsaturated carboxylic acid or its anhydride and a solvent at a high temperature in the presence of a radical polymerization initiator. Further, it can be also produced by merely melting and kneading a mixture of polypropylene and an unsaturated carboxylic acid or its anhydride without using any solvent.

In the composition used in the present invention, very low density polyethylene is incorporated with the acid modified polypropylene. Particularly, by incorporating 20 to 3% by weight of very low density polyethylene is incorporated with 80 to 97% by weight of the acid modified polypropylene, a powdered paint which is suitable for the purpose of the present invention can be obtained. When the amount of very low density polyethylene is lower than 3% by weight, elongation and heat stability of the coating film formed on a metal are not improved. When the amount exceeds 20% by weight, it is not preferred because adhesiveness and hardness of the coating film become inferior.

Regarding densities of the modified polypropylene and very low density polyethylene, it is preferred that their densities are as close as possible and therefore, in the present invention, the modified polypropylene and very low density polyethylene having densities within the above ranges are used.

In order to incorporate very low density polyethylene with the modified polypropylene, they are mixed in a mixer such as Henschel mixer, blender or the like and then the mixture are kneaded with an extruder to obtain pellets. The pelletized composition is mechanically pulverized to obtain powder having average particle size of not more than 500μ, preferably 50 to 300μ. This is used as a powdered paint in powder coating. For powder coating with this powdered paint, there can be employed any conventional method such as fluidized bed dip coating, electrostatic coating, electrostatic dip coating and the like.

In the present invention, a metallic article to be subjected to powder coating is preheated to 200° to 250° C. with a heating device such as an electric furnace having a temperature controller and then, in the case of fluidized bed dip coating, the metallic article is dipped in a vat wherein the resin powder is fluidized for several seconds to several minutes. In this case, it is of importance that the surface temperature of the article to be coated should be controlled so that the temperature of the molten resin is lower than the decomposition temperature of the modified polypropylene (i.e., 250° to 253° C.) because, when the temperature exceeds this range, the main chain of the polymer rapidly begins to decompose, which results in deterioration of the resin.

After coating, it is heated at 160° to 230° C. to make the surface of the resulting coating film smooth. Preheating and post-heating times can not be specifically limited because they vary depending upon a particular heating temperature and size of a particular article to be coated. However, for example, pre-heating can be carried out at 250° C. for about 20 to 30 minutes and post-heating can be carried out at 230° C. for about 15 to 20 minutes or at 200° C. for about 40 to 60 minutes. When the post-heating time is too long, sags of the coating film and deterioration of the resin are resulted. On the other hand, the time is too short, as a matter of course, the resulting coating film is deficient in smoothing.

The method of the present invention can be applied to any metallic article which should be subjected to powder coating.

In the case that metallic articles to be coated are those such as plates, parcel lacks, vessels and the like wherein the paint is applied on the surfaces thereof, so-called fluidized bed dip coating is advantageously employed. In the case that metallic articles to be coated are those such as pipes wherein it is necessary to apply the paint on the inner surfaces, the coating film can be formed by employing spray coating method wherein the resin powder is spread on the inner surfaces of preheated pipes or a method wherein the resin powder is sucked into preheated pipes.

In general, polypropylene has heat resistance. Therefore, when the above modified polypropylene is blended with very low density polyethylene, the resulting coating film firmly adheres to a metal and can sufficiently stand continuous use under high temperature conditions.

However, in a hot water atmosphere, sometimes, water is condensed between a coating film and a surface of a metal because water vapor permeates through the coating film and thereby adhesion between the coating film and metal is weakened. As the result, there can be observed such a phenomenon that the coating film separates from or peels off the surface of metal.

In order to prevent this phenomenon, in another aspect of the present invention, a metallic article to be coated is firstly treated with a primer comprising a diene polymer and magnesium oxide and then the resultant is subjected to powder coating with the above resin composition. It has been found that fitness between a coating film and a surface of a metal is remarkably improved by treatment with the above primer and therefore firm adhesion can be maintained for a long period of time not only under usual high temperature conditions, but also at hot water dipping.

Although the function and mechanism of the primer comprising a diene polymer and magnesium oxide are not clear, it is considered that a certain chemical bonding force may be produced between the primer and the coating film.

A method for applying the primer to a metallic article is not specifically limited. However, dip method wherein the article is dipped in the primer solution can be advantageously employed. The diene polymer used in the present invention includes synthetic rubbers such as polybutadiene rubber and NBR (acrylonitrile-butadiene copolymer), natural rubbers and the like. The diene polymer is usually used by dissolving it in a solvent such as carbon tetrachloride, chloroform and the like together with magnesium oxide. Optionally, a suspending agent or a dispersant such as finely divided silica particles, carbon black or the like can be added thereto.

After treatment with the above primer, a coating film having firm adhesiveness to a metal even in hot water dipping can be formed by drying the metallic article treated with the primer, preheating it, subjecting the preheated article to powder coating with the above resin composition wherein very low density polyethylene is blended with the modified polypropylene and then post-heating it.

In the present invention, optionally, nucleating agents such as para-t-buthylbenzoic acid, sorbitol derivatives and the like; pigments such as carbon black, titanium oxide and the like; antioxidants; ultraviolet absorbers; and the like can be added to the above resin composition so far as the advantages of the present invention are not impaired.

According to the method for powder coating of the present invention, the following advantages can be obtained.

(1) A coating film having heat resistance and hot water resistance due to the properties of polypropylene can be formed on a surface of a metal.

(2) The above coating film has enough fastness properties to protect the surface of a metal and, in addition, flexibility. Thereby, the powder coating of the present invention can apply to a metallic article, even if it has a complicated shape.

(3) Since adhesion between a coating film and a surface of a metal is very strong, adhesiveness does not decrease even under high temperature conditions. Further, by subjecting pre-treatment with the above primer, the resulting coating film can maintain adhesive strength for an extremely long period of time even in hot water dipping.

The following Preparations, Examples and Comparative Examples further illustrate the present invention in detail but are not to be construed to limit the scope thereof.

PREPARATION A

A crystalline ethylene-propylene random copolymer having ethylene content of 2.3% by weight, MI of 7.6 g/10 min. was modified with maleic anhydride to obtain a modified polypropylene [modified PP (A)] having maleic anhydride content of 0.1% by weight, MI of 48 g/10 min. and density of 0.900. This was premixed with a prescribed amount of very low density polyethylene [VLDPE (A)] (trade name: Exeren VL700 manufactured by Sumitomo Chemical Co., Ltd., Japan) having MI of 10 g/10 min. and density of 0.905 in Henschel mixer and melted and kneaded at 170° to 190° C. with an extruder to obtain pellets. The resulting pellets were frozen and pulverized to obtain a resin composition A having average particle size of 120μ.

PREPARATION B

40% By weight of the modified polypropylene obtained in Preparation A was blended with 60% by weight of a crystalline ethylene-propylene random copolymer having ethylene content of 2.3% by weight and MI of 7.6 g/10 min. to obtain a modified polypropylene [modified PP (B)] having MI of 22 g/10 min. and density of 0.900. This was premixed with a prescribed amount of very low density polyethylene [VLDPE (B)] (trade name: Exeren VL200 manufactured by Sumitomo Chemical Co., Ltd., Japan) having MI of 10 g/10 min. and density of 0.900. The resulting pellets were treated according to the same manner as described in Preparation A to obtain a resin composition B having average particle size of 150μ.

EXAMPLES 1 TO 3

By using the resin composition A having average particle size of 120μ obtained in Preparation A, a steel plate [JIS 3141 (SPCC-SD)] of 3.2 mm in thickness, 150 mm in length and 70 mm in width was subjected to powder coating according to fluidized bed dip coating method.

Heating conditions of the steel plate were as follows.
Pre-heating: 250° C. for 30 min.
Post-heating: 210° C. for 30 min.
Dipping time: 15 sec.

EXAMPLES 4 TO 6

By using the resin composition B having average particle size of 150μ obtained in Preparation B, the inner surface of a steel pipe [JIS G3452 (SGP)] of 27.6 mm in inner diameter, 34.4 mm in outer diameter and 150 mm in length was subjected to powder coating according to spray coating method.

The steel pipe was pre-heated at 250° C. for 30 min. The resin composition was spread on the inner surface of the pipe, while the pipe was rotated so that a uniform coating film was formed on the inner surface. Then, it was postheated at 210° C. for 30 minutes.

COMPARATIVE EXAMPLES 1 TO 3

According to the same manner as described in Examples 1 to 3, the steel plate was subjected to powder coating according to fluidized bed dip coating method by using as a resin powder composition composed of the modified PP (A) alone (Comparative Example 1), the modified PP (A) blended with conventional low density polyethylene (LDPE) (Comparative Example 2) and the modified PP (A) blended with modified polyethylene (Comparative Example 3), respectively (formulations are shown in Table 1).

EXAMPLES 7 TO 10

A primer composed of polybutadiene and magnesium oxide was applied on the surfaces of a steel pipe of 27.6 mm in inner diameter, 34 mm in outer diameter and 150 mm in length (the same as that used in Example 4 to 6) by dipping it in the primer. After drying, the inner surface of the pipe was subjected to powder coating by using the resin composition having average particle size of 150μ as shown in Table 2 according to the same manner as described in Examples 4 to 6.

COMPARATIVE EXAMPLES 4 TO 6

According to the same manner as described in Examples 7 to 10, the inner surface of the pipe was subjected to powder coating except that the resin composition and primer as shown in Table 2 was used.

In Table 1, there are shown the conditions for formation of the coating film (each having about 400μ in thickness) and the results of measurement of physical properties of the film obtained in Examples 1 to 6 and Comparative Examples 1 to 3.

Likewise, the results of Examples 7 to 10 and Comparative Examples 4 to 6 are shown in Table 2. For reference, the results of Example 1 are also shown in Table 2.

The measurements were carried out as follows.

(1) Elongation of Coating Film

A steel plate of 10 mm in thickness, 150 mm in length and 150 mm in width which had been previously coated with a silicone grease as a release medium was placed on a press heater maintained at 200° C. and then a powder resin composition was applied thereon in the thickness of 2.5 mm uniformly to form a coating film. The thickness of the coating film was about 1 mm. The film was peeled off and elongation thereof was measured according to JIS K 7113 (No. 2 dumbbell was used).

(2) Adhesion

Parallel notches were provided to a coating film on a steel plate obtained by fluidized bed dip coating method at intervals of 25 mm to obtain a test piece. The test piece was peeled off by using a tensile tester at the elongation rate of 50 mm/min and adhesive strength at 180° peel off was recorded. (In case of a steel pipe, the pipe was divided lengthwise into two pieces and parallel notches were provided on the inner surface thereof.) By using this piece, adhesive strength was measured and recorded according to the same manner as described above.)

(3) Surface Smoothness

Surface appearance of a coating film was evaluated by the naked eye.

TABLE 1

| | Resin composition (% by weight) | | | | | | Coating film | | | |
| | Modified PP | | VLDPE | | Others | | Elongation | Smoothness | Adhesion | |
| | (A) | (B) | (A) | (B) | LDPE*1 | Modified*2 PE | (%) | (naked eye) | Initial | High temp.*3 treatment |
|---|---|---|---|---|---|---|---|---|---|---|
| Ex. 1 | 95 | — | 5 | — | — | — | 300–400 | good | not peelable | not peelable |
| Ex. 2 | 90 | — | 10 | — | — | — | 200–300 | " | " | " |
| Ex. 3 | 85 | — | 15 | — | — | — | 200–250 | " | " | " |
| Ex. 4 | — | 95 | — | 5 | — | — | 350–450 | " | " | " |
| Ex. 5 | — | 90 | — | 10 | — | — | 300–400 | " | " | " |
| Ex. 6 | — | 85 | — | 15 | — | — | 250–350 | " | " | " |
| Comp. Ex. 1 | 100 | — | — | — | — | — | 20–30 | " | " | peeled off |
| Comp. Ex. 2 | 92.5 | — | — | — | 7.5 | — | 20–30 | " | " | " |
| Comp. Ex. 3 | 85 | — | — | — | — | 15 | 20–30 | " | " | " |

*1: Low density polyethylene (trade name: Sumikathen manufactured by Sumitomo Chemical Co., Ltd.) density: 0.927, MI: 7 g/10 min.
*2: Modified polyethylene (trade name: Admer manufactured by Mitsui Petrochemical Co., Ltd.) density: 0.925, MI: 10 g/10 min.
*3: The coating film was treated in an oven at 200° C. for 2 hours.

TABLE 2

| | Resin composition (wt %) | | | | | Coating film | | | | |
| | Modified PP | | VLDPE | | | Elongation | Smoothness | Adhesion | | |
| | (A) | (B) | (A) | (B) | Primer | (%) | (naked eye) | Initial | High temp.*5 treatment | Hot water*6 dipping |
|---|---|---|---|---|---|---|---|---|---|---|
| Ex. 7 | — | 95 | 5 | — | *1 | 300–400 | good | not peelable | not peelable | not peelable |
| Ex. 8 | — | 90 | — | 10 | *1 | 200–300 | " | " | " | " |
| Ex. 9 | 85 | — | — | 15 | *1 | 200–250 | " | " | " | " |
| Ex. 10 | 95 | — | 5 | — | *1 | 300–400 | " | " | " | " |
| Comp. Ex. 4 | 95 | — | 5 | — | P3C*2 | 300–400 | " | " | " | peel off after 200 hrs. |
| Comp. Ex. 5 | 95 | — | 5 | — | SU*3 | 300–400 | " | " | " | " |
| Comp. Ex. 6 | 95 | — | 5 | — | KBM503*4 | 300–400 | " | " | " | " |
| Ex. 1 | 95 | — | 5 | — | — | 300–400 | " | " | " | peel off |

TABLE 2-continued

| Resin composition (wt %) | | | | | | | Coating film | | |
|---|---|---|---|---|---|---|---|---|---|
| Modified PP | | VLDPE | | | Elongation | Smoothness | Adhesion | | |
| (A) | (B) | (A) | (B) | Primer | (%) | (naked eye) | Initial | High temp.*5 treatment | Hot water*6 dipping |
| | | | | | | | | | after 50 hrs. |

*1 polybutadiene-magnesium oxide primer
*2 primer manufactured by Japan Rilsan Co., Ltd.
*3 epoxy primer manufactured by Shinto Kagaku Co., Ltd., Japan
*4 silane primer manufactured by Shinetsu Kagaku Co., Ltd., Japan
*5 the same as Table 1
*6 dipped in hot water (90° C.) for 3,000 hours As is clear from Table 1, when the coating film is formed on the surface of a metal according to the method of the present invention, elongation of the resulting coating film is more than 10 times as much as that of the film obtained by powder coating with the powder resin composition of Comparative Examples. Further, the film according to the present invention has excellent adhesiveness under high temperature conditions.

Further, as is clear from Table 2, when the primer composed of polybutadiene and magnesium oxide is used, extremely superior effects are obtained. For example, adhesive strength under the condition of hot water dipping can be maintained more than 15 times as long as those of the films obtained by using the other primers.

What is claimed is:

1. A method for powder coating of a metallic article which comprises subjecting the metallic article to powder coating with a resin composition comprising 80 to 97% by weight of a modified polypropylene and 20 to 3% by weight of very low density polyethylene to form a resin coating film on the article.

2. A method for powder coating according to claim 1, wherein the modified polypropylene is a polypropylene copolymer obtained by graft copolymerization of all of a part of a crystalline random polymer composed of 90 to 99% by weight of propylene and 10 to 1% by weight of an α-olefin having 2 to 10 carbon atoms other than propylene with an unsaturated carboxylic acid or its anhydride, said modified polypropylene having density of 0.885 to 0.920.

3. A method for powder coating according to claim 1, wherein the very low density polyethylene has a density of 0.880 to 0.920.

4. A method for powder coating according to claim 1, wherein coating is carried out by heating a surface of said metallic article to 200° to 250° C.

5. A method for powder coating according to claim 1, wherein post-heating is effected at a temperature of 160° to 230° C. after coating.

6. A method for powder coating according to claim 1, wherein the resin composition has average particle size of 50 to 300μ.

7. A method for powder coating according to claim 1, wherein a surface of said metallic article is treated with a primer composed of a diene polymer and magnesium oxide before coating.

8. A method for powder coating according to claim wherein the diene polymer is polybutadiene.

* * * * *